May 13, 1958   J. PAPARELLI ET AL   2,834,628
DOOR LOCK KNOB
Filed Aug. 18, 1954

INVENTORS
JOSEPH PAPARELLI
BERTRAM M. KAPLAN
BY
ATTORNEY

United States Patent Office 2,834,628
Patented May 13, 1958

2,834,628
DOOR LOCK KNOB

Joseph Paparelli, Yonkers, and Bertram M. Kaplan, Bayside, N. Y., assignors to Kastar Incorporated, Bronx, N. Y., a corporation of New York Application August 18, 1954, Serial No. 450,754

8 Claims. (Cl. 292—347)

This invention relates to a safety lock and more particularly to a safety lock for use in automobile doors.

Automobile doors are normally provided with locks which may be operated from the inside of the car by depressing a cap located in the window frame. The door may then be opened either by raising the cap manually or through the use of a key on the outside of the automobile door. Such an arrangement is especially suitable where it is desired to lock a car while it is unoccupied so that it may not be entered by an unauthorized person. However, it is frequently desired to lock an automobile door from the inside in such a manner that the lock may not, without the exercise of a certain degree of intelligence, be released.

Particularly is this mode of locking from the inside desirable where children are to be carried in the back seat without adult supervision. The simple depression of the common door lock cap is no assurance against the prying curosity of a normal child, who may raise the cap, manipulate the door handle, and fall out of the car. And yet it is not always possible to have an adult accompanying the child or children in the back seat. In some cases parents resolve this difficulty by buying a car with only two doors, that is one where the back seat is not directly accessible by its own doors. But such a vehicle is frequently inadequate for the needs of the family when children are not being transported. Adults find it far more convenient to enter the rear seat of an automobile by doors opening directly upon that seat. It should be pointed out that an alternative to solving the problem of transporting children by using a vehicle with only two doors, would be to carry the children in the front seat with the driver. The difficulty here is that their restless behavior is a source of distraction to the driver and consequently a source of danger to all of the passengers.

It is therefore the primary object of this invention to provide a safety door lock knob operable from the interior of the car which may not readily be released by children of years so tender that they cannot comprehend the danger to themselves of opening the door of the car while the car is in motion. This is done by making the construction of the safety door lock knob complicated enough so that the normal young child cannot release it, and yet which construction offers no problem for release, so far as an adult is concerned. The safety door lock knob is simply installed by replacing the normal projecting cap of the door lock with which the car is normally equipped with it. This safety device is operable by two essentially distinct actions. The first of these actions automatically locks the car by spring action. The safety door lock knob is then by a very simple manipulation prevented from moving either up or down. In this position the door is safely and securely locked even against the possibility of tampering by juvenile passengers. To then release the lock, the safety door lock knob is first depressed, in which position it may by a simple manipulation be fixed. Release is then accomplished by raising the safety door lock knob in the same manner as would be proper with the conventional door lock cap. Indeed the safety door lock knob may in the last named position be operated in exactly the same manner as the conventional door lock cap, locking the door when it is manually depressed and releasing the door lock when it is manually raised.

A further object of this invention is to make provision for the safety locking of a door without requiring any alteration in the door structure, or the affixation of any installation upon the door.

Finally, it is an object of this invention to accomplish all of the foregoing by a device of simple construction which will therefore be inexpensive to manufacture. The carrying out of this object is to be assured by making the assembly for the device from components of simple shape which present no difficulty in fabrication.

How these and many other objects are to be implemented will become clear through a consideration of the accompanying drawings wherein.

Figure 1:
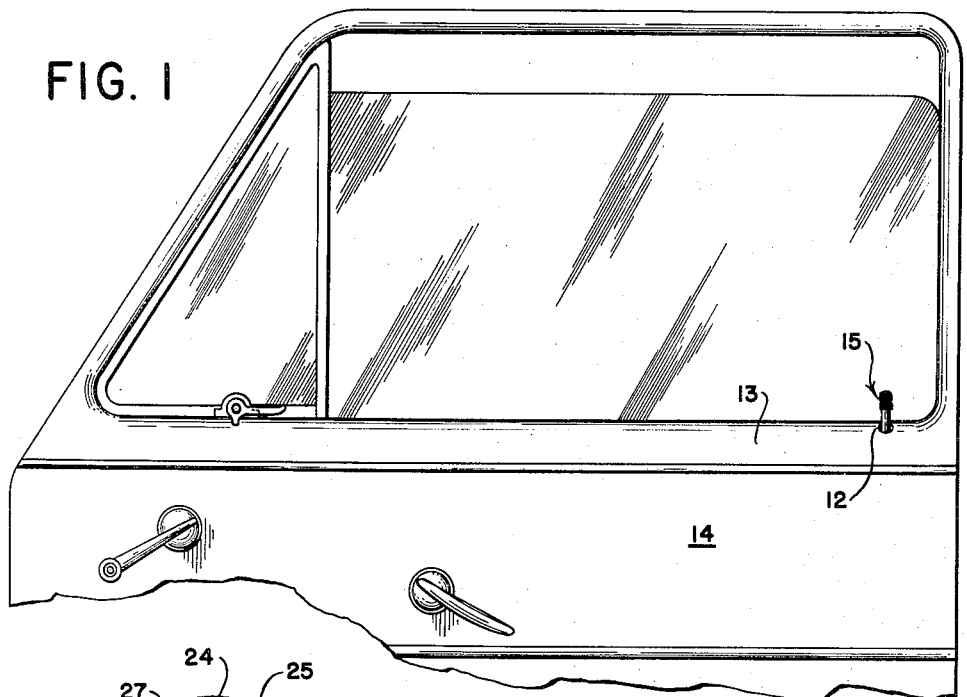
Fig. 1 is an elevational view of the interior of an automobile door in which my novel safety door lock knob is utilized.
Figure 2:
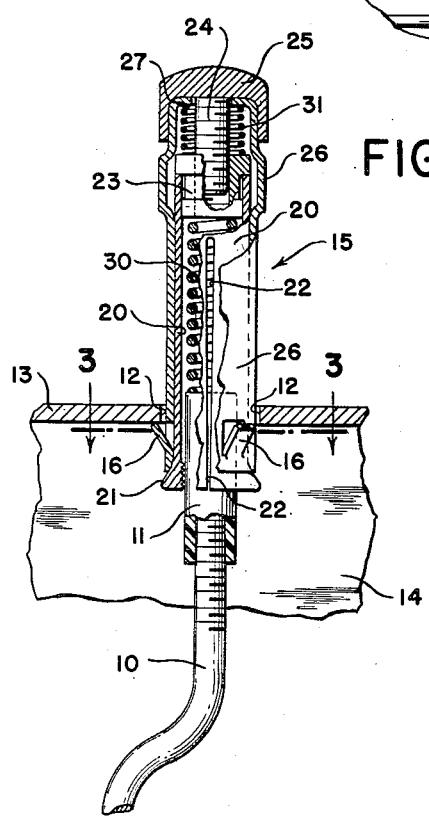
Fig. 2 is a partially broken vertical section through the safety door lock knob, showing the rod by which the terminal member is actuated.
Figure 3:
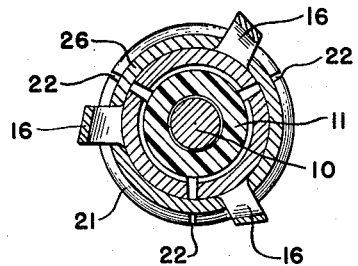
Fig. 3 is a section on the line 3—3 of Fig. 2.

The actual locking mechanism for the automobile door is not shown in the drawings, this being of known construction actuated when rod 10 is either raised or depressed. To permit operation of the safety door lock knob, terminal member 11 is threaded onto rod 10. Terminal member 11 is normally in line with hole 12 in frame 13 of automobile door 14. The safety door lock knob 15, which is alternatively herein referred to as the control mechanism, is then inserted through hole 12, and a portion of terminal member 11 enters the open end of the control mechanism 15. Upon passage of the control mechanism through hole 12, fins 16 which are retractably built into the control mechanism, spring outwardly to engage the underside of frame 13.

The control mechanism proper is comprised of a sleeve 20 which fits over terminal member 11. One end portion of sleeve 20 is flared at 21, and the sleeve has a longitudinal slot 22 therein whereby the sleeve is rendered readily compressible. Internally threaded stud 23 is fitted tightly into the other end of sleeve 20, and threaded screw 24, part of cap 25, is engaged within the threads of stud 23.

Fitting over the sleeve 20 is shell 26 having a shoulder 27 at one end thereof. Spring 30 of the assembled control mechanism fits within sleeve 20 and at one end is in contact with terminal member 11, and at the other end is in contact with stud 23, which closes off one end of sleeve 20. Further, in the assembled control mechanism a second spring 31 abuts at one end against the top of stud 23 and at the other end against the underside of shoulder 27.

The basic principle of operation of the control mechanism is that the control mechanism may be locked into place relative to either the upper or lower portion of terminal member 11. The manner in which this is done, regardless of which portion of the terminal member is to be engaged, whether upper or lower, is to rotate cap 25 in such manner that threading of the screw 24, which is a part of the cap, into the stud 23 will be caused. The net effect of this will be that sleeve 20 is drawn up into shell 26. As this drawing up progresses the flared portion 21 of the sleeve 20 will come into the open end of the shell 26, and compression of the sleeve will be caused, and permitted because of slot 22, so that the sleeve will frictionally grip terminal member 11. It should be observed that during rotation of cap 25, rotation of the shell 26 may be prevented by manually gripping the shell, while rotation of the sleeve 20 is prevented because spring 31 bears against it.

The second important movement within the control mechanism is that when sleeve 20 is released from frictionally gripping terminal member 11 while spring 30 is compressed, spring 30 will expand to cause depression of terminal member 11, thus actuating the door lock through rod 10.

By making use of these two key operations of the control mechanism, a thoroughly safe means for locking the door is provided. The way in which this will work is that when the control mechanism is in the up position, that is with fins 16 in contact with the underside of frame 13, and frictional gripping of terminal member 11 is released by loosening cap 25, spring 30 will depress terminal member 11. By then tightening down cap 25 without depressing the control mechanism, so that the upper portion of terminal member 11 is frictionally gripped, the door is locked and the control mechanism can be moved neither up nor down. Release of the control mechanism, while moderately complicated, presents no real difficulty except to a child's undeveloped mind. The way in which the mechanism is released is to loosen cap 25 by rotating it, depressing the control mechanism and retightening cap 25 so that the control mechanism frictionally grips the lower portion of terminal member 11. The control mechanism may then be manually raised in the same manner as the ordinary plastic piece now conventionally found in automobile doors for locking the same. Indeed when the control mechanism grips the lower portion of terminal member 11 the control mechanism is manually operable in the same manner as a conventional door lock cap.

The function of spring 31 is to assure ready release of the terminal member by sleeve 20 when cap 25 is rotated. The spring 31 acts to impart a downward force against the sleeve 20 to disengage flared portion 21 of the sleeve from the shell 26 when cap 25 is loosened, thereby releasing the terminal member 11. It will be noted as well that spring 31 acts to keep cap 25 seated for rotation on the shoulder 27 of shell 26, particularly when cap 25 is rotated to release the terminal member.

While we have described a specific embodiment of our invention it is apparent that changes and alterations may be made therein without departing from the spirit of our invention.

We claim:

1. In an automobile door having a window frame with an aperture therein and a terminal member which may be depressed to a first position to lock said automobile door and raised from said first position to a second position to unlock said door, a control mechanism movable within said aperture, said control mechanism having a first means for releasably engaging said terminal member, a second means for preventing upward movement of said control mechanism beyond a point of maximum extension through said aperture, and spring means for maintaining said terminal member in said first position and said control mechanism at said point of maximum extension when said terminal member is not engaged by said control mechanism, whereby when said terminal member is in said first position and said control mechanism is at said point of maximum extension and said terminal member is engaged by said control mechanism, said terminal member may not be moved from said first position, said control mechanism being movable from said point of maximum extension to a down position, whereby when said terminal member is in said first position and said control mechanism is in said down position and said terminal member is releasably engaged by said control mechanism, said door may be unlocked by moving said control mechanism.

2. A control mechanism as claimed in claim 1 wherein said first means comprises a compressible sleeve within which sleeve said terminal member is slidable and means for releasably compressing said sleeve, said sleeve when compressed being in frictional engagement with said terminal member.

3. A control mechanism as claimed in claim 1, said control mechanism having a shell open at one end and having a shoulder at the other end defining an opening, and a cap in contact with said shoulder, said cap having a screw integral therewith passing through said opening, and wherein said first means comprises a slotted sleeve within which sleeve said terminal member is slidable, said sleeve being partially within said shell, said sleeve having a flared end outside the open end of said shell and a threaded opening in the other end thereof, said screw being in engagement with said threaded opening, whereby when said cap and screw are rotated, said sleeve will be drawn up into said shell, said flared end of said sleeve coming into contact with the open end of said shell to compress said sleeve, whereupon said sleeve will frictionally grip said terminal member.

4. A control mechanism as claimed in claim 1 having a shell, and wherein said second means comprises a plurality of retractable fins mounted in said shell.

5. A control mechanism as claimed in claim 1 having an internal end surface and wherein said spring means comprises a helical spring in contact at one end with said terminal member and at the other end with said internal end surface.

6. A control mechanism as claimed in claim 1 including, spring means to aid said first means in releasing said terminal member from said control assembly after said terminal member and said assembly have been releasably engaged.

7. A control mechanism as claimed in claim 3 including a compressible helical spring within said shell, one end of said spring being in contact with said shoulder of said shell, and the other end being in contact with said sleeve, said helical spring being compressed when said cap and screw are rotated in one direction to cause said sleeve to frictionally grip said terminal member, said spring acting to urge the flared end of said sleeve out of contact with said shell to release said terminal member when said cap and screw are rotated in the other direction.

8. In combination in a door, a door locking mechanism having a terminal member having upper and lower portions mounted thereon, and a door lock knob for alternative releasable engagement with said upper and lower portions of said terminal member, said terminal member when depressed to a first position causing said locking mechanism to lock to prevent opening of said door, and when raised to a second position releasing said locking mechanism to permit opening of said door, said door lock knob including a releasably compressible sleeve, one end thereof being open and fitting over said terminal member, the other end thereof being closed except for a threaded aperture, the external surface of said sleeve flaring at its open end, the balance of the external surface of said sleeve being of uniform diameter, said sleeve having a longitudinal slot therein extending from said open end for a portion of the length of said sleeve, and a shell fitting concentrically over a portion of said sleeve, said shell being open at one end, the diameter of said shell being greater than that of the portion of said sleeve of uniform diameter but less than that of the flared portion of said sleeve, and a rotatable threaded screw for engagement with said threaded aperture, whereby when said screw is threaded into said aperture, a portion of the flared end of said sleeve will be drawn into said shell to reduce the internal diameter of said sleeve in at least one direction to cause said sleeve frictionally to grip said terminal member.

References Cited in the file of this patent

UNITED STATES PATENTS

| | | |
|---|---|---|
| 1,548,371 | Moore | Aug. 4, 1925 |
| 1,947,282 | Theis | Feb. 13, 1934 |
| 2,629,246 | Schumann | Feb. 24, 1953 |
| 2,676,479 | Bethune | Apr. 27, 1954 |
| 2,694,917 | Trammell | Nov. 23, 1954 |